United States Patent
Van Winsen et al.

[15] 3,703,761
[45] Nov. 28, 1972

[54] METHOD OF ASSEMBLING ELASTIC COUPLING

[72] Inventors: Frederick H. Van Winsen, Kircheim/Teck; Hans-Karl Daur, Stuttgart-Bad Cannstatt, both of Germany

[73] Assignee: Daimler-Benz Aktiengesellschaft, Stuttgart-Unterturkheim, Germany

[22] Filed: Sept. 12, 1969

[21] Appl. No.: 871,066

Related U.S. Application Data

[62] Division of Ser. No. 601,624, Dec. 14, 1966, Pat. No. 3,501,184.

[30] Foreign Application Priority Data

Dec. 14, 1965    Germany...D 48 905 XI1/47a

[52] U.S. Cl. ........................29/436, 29/509, 29/520
[51] Int. Cl. ...........................................B23p 19/00
[58] Field of Search .287/88, 87; 29/436, 520, 149.5, 29/509

[56] References Cited

UNITED STATES PATENTS

| | | |
|---|---|---|
| 1,793,874 | 2/1931 | Skillman...............287/87 UX |
| 1,827,267 | 10/1931 | Short..................29/149.5 NM |
| 3,030,132 | 4/1962 | Compton..................287/87 X |
| 3,117,810 | 1/1964 | Hutton .........................287/87 |
| 3,199,186 | 8/1965 | Simpson .....29/149.5 NM UX |

*Primary Examiner*—Charlie T. Moon
*Attorney*—Craig, Antonelli and Hill

[57] ABSTRACT

The present disclosure relates to an elastic coupling and a method for its construction wherein the elastic coupling includes an annular rigid outer member, a rigid inner member, an annular elastic intermediate member and side members. The inner, outer and intermediate members are constructed and assembled so that there is substantially no stressing of the intermediate elastic member. Thereafter, the side members are axially forced together to axially compress the elastic member and expand the elastic member into engagement with both the inner and outer members. At least one of the members is radially deformed to hold the side members in their axially displaced positions to produce a final assembly. The outer member may comprise a rigid ring and a plurality of arcuate sections of sheet metal having outward deformation axially engaging the ring at opposite axial ends to prevent relative axial movement; also, the arcuate sections being provided with outer portions that may be deformed inwardly to axially engage the side members after assembly and stressing of the elastic member. The outer member and adjacent surface of the elastic member may have cylindrical bearing surfaces. The inner member and the adjacent bearing surface of the intermediate elastic member may have engaging spherical surfaces. Furthermore, the side members may have spherical portions corresponding to the adjacent spherical portions of the inner member with the elastic member therein. The radial deformations between the arcuate sections and the ring of the outer member may be either formed simultaneously with the formation of the deformations engaging the side members or they may be preformed prior to the assembly of the outer member.

6 Claims, 7 Drawing Figures

PATENTED NOV 28 1972

3,703,761

INVENTORS
FRIEDRICH H. VAN WINSEN
HANS-KARL DAUR

BY *Craig, Antonelli, Stewart & Hill*

ATTORNEYS

METHOD OF ASSEMBLING ELASTIC COUPLING

This is a division of application Ser. No. 601,624, filed Dec. 14, 1966, now U.S. Pat. No. 3,501,184.

BACKGROUND OF THE INVENTION

It is known in the prior art to provide a substantially rigid outer member, a substantially rigid inner member and a radially stressed elastic member therebetween held in a stressed position by side members. However, such couplings have been relatively expensive and complicated in their manufacture as well as in their assembly. It is an object of the present invention to overcome the disadvantages by providing a coupling that is similar in its construction and more readily mass produced in a more economical manner.

BRIEF DESCRIPTION OF THE INVENTION

The above-mentioned coupling of the present disclosure can employ an outer housing or member that includes a sheet metal stamping that is easily manufactured and readily deformable both radially outwardly to engage the outer ring and radially inwardly to engage and hold the side members in their position to stress the intermediate elastic member. These radial deformations may be readily accomplished in a simple, economical and rapid manner during mass production. Also, the sheet metal portion of the outer member may be quickly brought into form-locking engagement preventing relative axial displacement with the ring-shaped member to be coupled by providing this metal stamping with preformed radially outwardly extending deformations that form a U-shape annular channel for engaging the ring; this sheet metal stamping may be basically annular and split into a plurality of arcuate sections for easy assembly with the ring.

Preferably, the outer member has a cylindrical inner bore and the intermediate elastic member has a correspondingly shaped cylindrical outer bearing surface. Also, it is a specifically advantageous feature of the present invention that the inner member has a spherical outer bearing surface engaging a correspondingly spherical inner bearing surface of the intermediate elastic member so that the two may be assembled together. Thereafter, the assembled inner and intermediate members may be quickly and freely brought into an assembled relationship with the outer member because of the cylindrical bore of the outer member and the corresponding cylindrical outer bearing surface of the intermediate member without stressing of the elastic intermediate member. A preferred construction is such that the final assembly is accomplished by pressing the side members radially inwardly toward each other so that the elastic member is radially expanded into engagement with both the inner and outer members, and the sheet metal stamping portion of the outer member is radially deformed inwardly to hold the side members in their inwardly displaced positions.

Also, the sheet metal stamping portion of the outer member may be in a continuous ring and the radial deformation preventing relative movement between the sheet metal stamping portion and ring portion of the outer member and the radial deformation of the sheet metal portion of the outer member to engage the side members may be formed in a single production step, that is, simultaneously.

Further objects, features, and advantages of the present invention will become more apparent from the following detailed description of the drawing.

Figure 1:
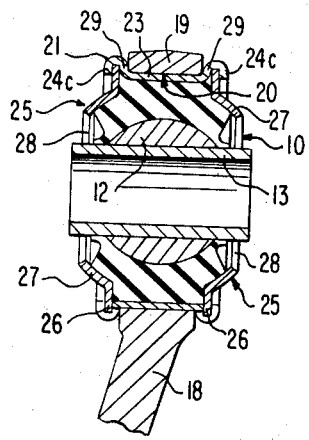
FIG. 1 shows an axial cross-sectional view through an elastic coupling of the present invention, particularly a torsion rod in the motor vehicle.
Figure 2:
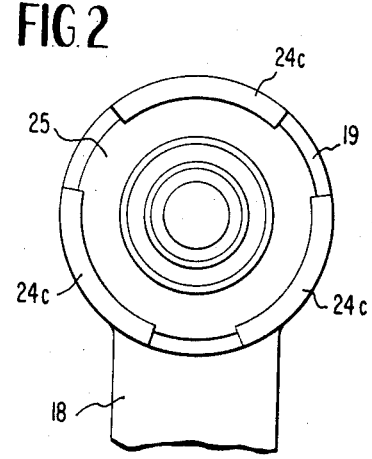
FIG. 2 is a side view of the elastic coupling according to FIG. 1.
Figure 5:
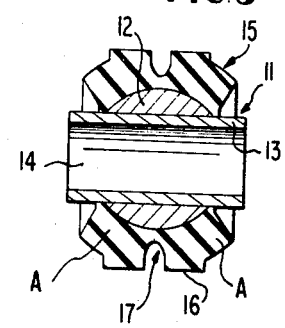
FIG. 5 illustrates the intermediate member and the inner member of the present invention prior to its assembly with the outer member.

The elastic rubber-metal coupling 10 in FIG. 1 may be the torsion rod coupling in an automotive vehicle; however, the coupling may be used in other environments according to the broad aspects of the present invention. Referring more specifically to FIG. 5, the coupling includes a metallic inner member 11 provided with a spherical body 12 rigidly mounted on a tube like leg 13 that has an axial bore 14. A torsion member, for example, may be rigidly attached to the tube 13 through the bore 14. An annular elastic intermediate member 15 may be mounted on the inner member 11, preferably rigidly. Intermediate member 15 may be constructed of rubber, for example. The intermediate member 15 is provided with a spherical inner bearing surface in engagement with the bearing body 12 and is provided with an outer cylindrical bearing surface 16, which has a slot-like annular groove 17 cut in the radial direction. The annular groove 17 divides the intermediate member into two sections, A. The inner member 11 and the intermediate member 15 are symmetrical and concentric.

As shown in FIG. 1, a torsion rod 18 is provided with a relatively rigid ring or eye joint 19, which is provided with a cylindrical bore 20. According to one embodiment, a plurality of arcuate sheet metal sections 21 may be inserted into the bore 20. The ring 19 and arcuate sections 21 constitute the outer member of the elastic coupling.

Figure 3:
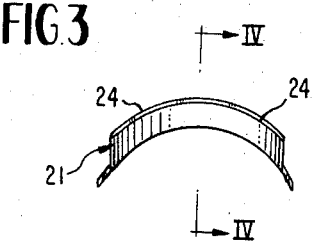
FIG. 3 is a side view of one arcuate section of the stamping portion of the outer member, according to one embodiment of the present invention.
Figure 4:
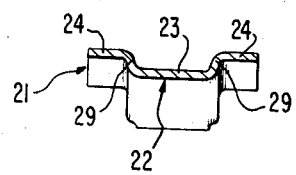
FIG. 4 is a cross-sectional view taken along line IV—IV of FIG. 3.

The three arcuate sections 21 are substantially of identical construction, one being shown in FIGS. 3 and 4. Before assembly, each of the arcuate sections 21 has a substantially U-shaped outwardly opening arcuate channel deformation 22 for engaging the ring 19 to prevent relative axial movement. During assembly, the three arcuate sections 21 are inserted into the bore 20 so that the U-shaped deformations 22 engage the ring 19 to prevent relative axial movement. With the thus assembled outer member, the inner surfaces of the arcuate section walls 22 form a continuous uniform inner cylindrical bearing surface and bore into which the elements of FIG. 5 may be inserted without stressing or deformation of the intermediate elastic member 15.

In FIGS. 3 and 4, the arcuate sections 21 are shown before they are assembled. In this condition, they have cylindrical outer walls or flanges 24 that are substantially parallel to the walls 23.

A plurality of sheet metal stamping side members, for example, two, are provided on each side of the intermediate member 15, preferably one annular side member on each side of the intermediate member 15. Preferably, the side members 25 are provided with a radial disk-like edge portion 26, an annular spherical portion 27 complementary in shape to the spherical body 12, and a bore 28 concentric with the other members.

During assembly, the inner, intermediate and outer members are assembled as mentioned above with the arcuate sections 21 in the form shown in FIGS. 3 and 4. Thereafter, the sheet metal stamping side members 25 are concentrically disposed on opposite sides of the intermediate member 15 in close engagement with the walls 24 of the arcuate sections 21 and in engagement with the intermediate elastic member 15. By using an assembly instrument, or by hand, the side members 25 may be pressed axially toward each other to axially compress and radially expand the intermediate member until the side members abut against the transition ledges 29 of the arcuate sections 21. In this position, the intermediate member 15 is expanded resiliently outwardly into tight engagement with the walls 23 of the arcuate sections 21 and elastically inwardly into engagement with the spherical body 12. It is contemplated that the spherical body 12 may be elastic so that it may be elastically compressed into engagement with the tube 13 or the spherical body 12 may be relatively inelastic. In this stressed condition, the sections A may be pushed axially together to close the annular slot 17, which was provided to obtain additional resiliency of the intermediate member 13. Simultaneously, the walls 24 may be deformed inwardly to produce radially inwardly extending flanges 24c, FIG. 1, that axially engage opposite sides of the side members 25 to hold the side members 25 in their inwardly displaced positions and the elastic member 15 in its stressed condition. It is thus seen that all the steps involved in the assembly of the elastic coupling according to the present invention may be performed simultaneously in a quick, easy manner that is particularly well adapted to mass production techniques.

Figure 6:
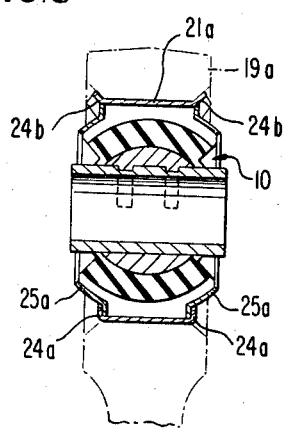
FIG. 6 illustrates another embodiment of the present invention in a cross-sectional view similar to FIG. 1, but showing the sheet metal portion of the outer member constructed as a single annular stamping.
Figure 7:
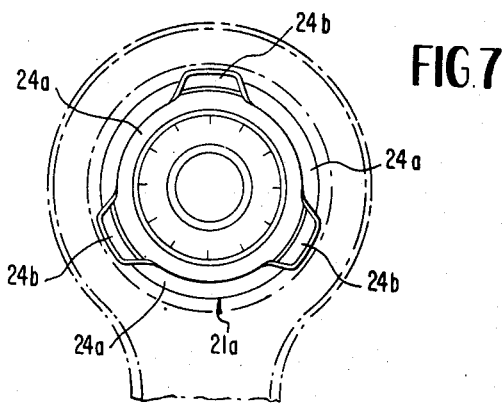
FIG. 7 is a side view of the elastic coupling according to FIG. 6.

Another embodiment of the present invention is shown in FIGS. 6 and 7, wherein identical numerals have been used to identify elements that are identical to those having the same numerals in FIGS. 1-5. In this construction, the outer member may comprise the rigid ring 19a and a single integral annular sheet metal stamping 21a, which is cylindrical and concentric with the other elements. Otherwise, the elastic joint is substantially identical to the joint illustrated in FIG. 1. Assembly of the joint is substantially identical with the assembly as mentioned above in regard to FIGS. 1-5. The outer housing sheet metal stamping 21a may be rigidly clamped to the rigid ring 19, which is shown in dotted lines by radially outward deformations 24b during assembly; three peripherally spaced outer deformations 24b of the sheet metal stamping 21a are shown in FIG. 7. Between the edge portion deformations 24b, there are provided three edge portion deformations 24a that extend inwardly to axially engage the side members 25a. Before assembly, the sheet metal stamping 21a is cylindrical; the deformations 24b and 24a are made in a single step at the time of assembly. The deformations 24b of FIG. 6 perform the same function as the transition portions 29 of FIG. 1 and the deformations 24a of FIG. 6 perform the same function as the deformations 24c of FIG. 1.

The embodiment of the elastic joint shown in FIGS. 6 and 7 is particularly desirable because the stamping 21a, the intermediate elastic member and the inner member may be constructed and preassembled for shipping, storage and sale prior to final assembly with a structural member 19 and another structural member to be inserted in the bore of the inner member.

The inner member and the stamping 21, 21a of the outer member may be sufficiently radially elastic, according to a narrow aspect of the present invention, so that they may be expanded radially into engagement with the concentric relatively rigid members to be coupled for providing only frictional forces between the stamping 21, 21a and the element 19, and between the inner member 11 and the other element (not shown) to be coupled.

The assembly of both the joint embodiment shown in FIGS. 1-5 and FIGS. 6 and 7, according to the preferred embodiments of the present invention can be accomplished simply and quickly by axially pressing together the side members and radially deforming the sheet metal edges of the outer member; this entire operation will produce at most only a negligible stress on the elements to be coupled together (only the element 19 is shown). Furthermore, by using the elastic coupling as shown in FIGS. 6 and 7, it is possible to rigidly clamp the intermediate elastic member with its attached inner member onto a single piece outer housing portion 21a, and simultaneously rigidly clamp the outer housing portion 21a to one of the elements to be coupled 19a. Both of the illustrated embodiments have the distinct advantage that they may be constructed entirely of an easily moldable elastic member and easily constructed sheet metal stampings, which are simple and inexpensive.

The foregoing description of the preferred embodiments is only for purposes of illustration, and it is contemplated that additional embodiments, variations and modifications may occur according to the spirit and scope of the present invention as defined by the following claims.

We claim:

1. A method for the assembly of an elastic coupling having an outer member, an annular elastic intermediate member, an inner member and side members with one of the side members on each free end of the elastic member, to and between two elements to be coupled together, comprising the steps of assembling said annular elastic intermediate member between the inner and outer members without stressing said elastic intermediate member, applying a force to said side members and axially displacing said side members toward each other to axially compress said elastic member and radially expand said elastic member into tight resilient engagement with the outer and inner members and simultaneously radially deforming at least one of said inner, outer and side members to hold said side members in their displaced positions.

2. The method according to claim 1, where the outer member is a sheet metal stamping, wherein said step of radially deforming is applied on said outer member sheet metal stamping.

3. The method according to claim 2, including the step of simultaneously radially deforming the outer member sheet metal stamping outwardly into axial engagement with the outer element to be coupled to prevent relative axial movement between the outer member and the outer element to be coupled.

4. A method for the assembly of an elastic coupling having an internal joint component joined to an inherently rigid spherical inner part, an annular elastic intermediate member externally arranged around said spherical inner part and said internal joint component, side members disposed on the axial sides of said annular elastic intermediate layer, and an external hollow cylindrical housing, comprising the steps of inserting substantially without pressure the elastic-rigid structure formed by the internal joint component, the spherical inner part, the annular elastic intermediate member, and the side members into the hollow portion of the external hollow cylindrical housing and applying a force to said side members to axially displace the same toward each other to axially compress said elastic intermediate member and radially expand said elastic intermediate member into tight resilient engagement with said external hollow cylindrical housing and deforming said external hollow cylindrical housing to hold said side members in their displaced positions.

5. A method according to claim 4 wherein said external hollow cylindrical housing is provided with at least one portion which is deformed to form a radially outwardly extending part for limiting the axial movement of said external hollow cylindrical member and at least one other portion which is deformed to form a radially inwardly extending part for holding said side members in their displaced positions.

6. A method according to claim 5 wherein said portions are subjected to a single deformation operation to form said radially inwardly extending part and said radially outwardly extending part for holding said side members in their displaced positions and for fixing the axial movement of said external hollow cylindrical housing.

* * * * *